US012737380B2

(12) United States Patent
Ma et al.

(10) Patent No.: US 12,737,380 B2
(45) Date of Patent: Sep. 15, 2026

(54) COMPONENT CHARACTERISTICS SIMILARITY COMPARISON

(71) Applicant: Salesforce, Inc., San Francisco, CA (US)

(72) Inventors: Billy Ma, San Mateo, CA (US); Brian Truong, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/224,272

(22) Filed: Jul. 20, 2023

(65) Prior Publication Data

US 2025/0028735 A1 Jan. 23, 2025

(51) Int. Cl.
*G06F 16/26* (2019.01)
*G06F 16/22* (2019.01)

(52) U.S. Cl.
CPC .......... *G06F 16/26* (2019.01); *G06F 16/2291* (2019.01)

(58) Field of Classification Search
CPC ............................ G06F 16/26; G06F 16/2291
See application file for complete search history.

(56) References Cited

U.S. PATENT DOCUMENTS

2021/0342785 A1* 11/2021 Mann .................... G06F 40/186
2022/0270152 A1* 8/2022 Theocharous ..... G06Q 30/0631

* cited by examiner

*Primary Examiner* — Aleksandr Kerzhner
*Assistant Examiner* — Aryan D Toughiry
(74) *Attorney, Agent, or Firm* — Holland & Hart, LLP.

(57) ABSTRACT

Techniques described herein support component maintenance that accounts for a similarity between characteristics of different components. To identify components with similar characteristics, one or more techniques described herein support generation of a data structure (e.g., a tree) that represents a component, where each characteristic may be represented in a different leaf node. The system may generate a similarity score, or value (e.g., as a percentage), between multiple components based on comparing individual nodes of a tree representing each component, respectively. If the similarity score satisfies a threshold, then the system may display, at the UI, a message indicating to a user to preferentially implement one component over another.

20 Claims, 11 Drawing Sheets

200

1100

COMPONENT CHARACTERISTICS SIMILARITY COMPARISON

FIELD OF TECHNOLOGY

The present disclosure relates generally to database systems and data processing, and more specifically to component characteristics similarity comparison.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support an application framework that is used to configure, deploy, and maintain applications (e.g., web applications). The application framework may be used to design and store various user interface (UI) components, which may be costly in terms of memory, storage, processing, and maintenance requirements, especially if UI components share similar characteristics.

DETAILED DESCRIPTION

A service may leverage an application framework that is used to develop custom applications and web-interfaces. For example, an administrator may access the application framework to develop custom user interfaces and services for an organization or for customers of the organization. The application framework may support various components of various component types, and each component may include or be defined by one or more characteristics (e.g., attributes, mouse click functionality, keyboard functionality, and other factors). Some components may have overlapping characteristics, and the multitude of teams and organizations that work on UIs may result in large numbers of similar components. As a result, significant memory/storage may be attributed to storing similar components, and the similar components may result in significant maintenance overhead. Additionally, the use of similar components may degrade runtime performance, as the client may download more component information (e.g., with duplicative characteristics) from a server.

Techniques described herein support component maintenance that accounts for a similarity between characteristics of different components. To identify components with similar characteristics, one or more techniques described herein support generation of a data structure (e.g., a tree) that represents a component, where each characteristic may be represented in a different leaf node. The system may generate a similarity score, or value (e.g., as a percentage), between multiple components based on comparing individual nodes of a tree representing each component, respectively. If the similarity score satisfies a threshold, then the system may display, at the UI, a message indicating to a user to preferentially implement one component over another. Additionally, or alternatively, if the similarity score satisfies a threshold, then the developer may reuse a component rather than developing a new component. In some examples, the component program may compare characteristics of components that have been updated, and may not compare non-updated characteristics. These and other techniques are described in further detail with respect to the figures.

Aspects of the disclosure are initially described in the context of an environment supporting an on-demand database service. Aspects of the disclosure are further described with respect to a computing environment, an example comparison, and a process flow. Aspects of the disclosure are further illustrated by and described with reference to apparatus diagrams, system diagrams, and flowcharts that relate to component characteristics similarity comparison.

Figure 1:
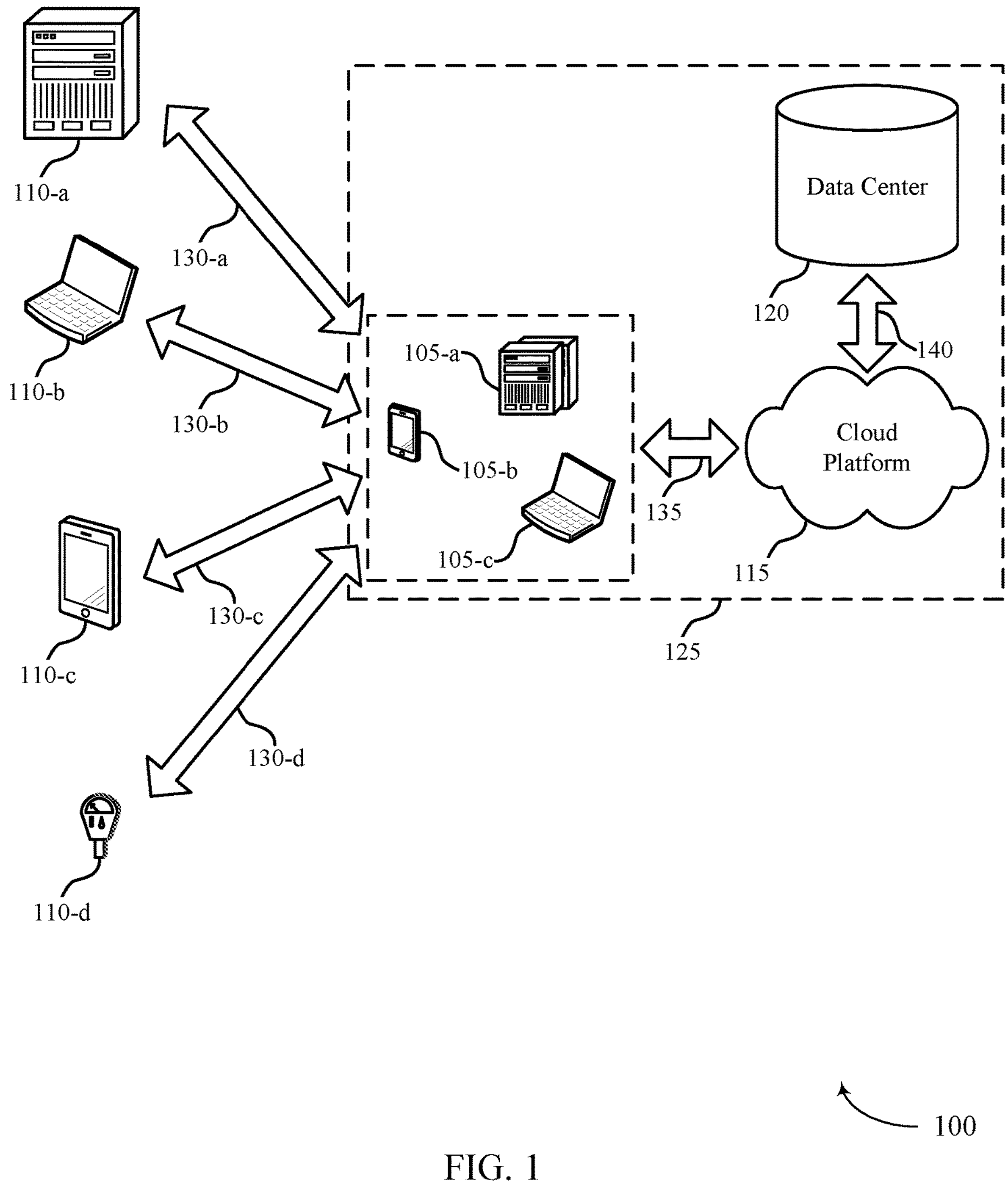
FIG. 1 illustrates an example of a data processing system that supports component characteristics similarity comparison in accordance with aspects of the present disclosure.

FIG. 1 illustrates an example of a system 100 for cloud computing that supports component characteristics similarity comparison in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*. 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with the same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The cloud platform 115 may also support an application framework that allows clients 105 to generate and deploy applications, which may be examples of web-applications, downloadable applications, or the like. For example, an administrator of the cloud client 105 may access the application framework to generate and deploy an application that is accessible by the contacts 110. The application framework may support multiple different generic or default user interface (UI) components or customized components. Each component may be associated with or defined by a set of characteristics. A characteristic may be a visual design, an interaction behavior, or both. For example, a characteristic may be associated with one or more of a structure behavior, user interaction behavior, an event behavior, a state behavior, or a relation behavior, which are described in further detail herein. Components of the application framework may be stored in a datastore (e.g., data center 120) associated with the application framework. As the application framework may support a multitude of UI components, some UI components may have the same or a similar set of characteristics. As such, storage of such UI components may include redundancies, which may be wasteful in terms of memory or storage overhead, and maintenance of such components may be resource intensive.

Techniques described herein support identification of similarities between UI components of an application framework. To support similarity identification, code and/or markup language defining a first UI component may be processed to generate a data structure that represents the first UI component. The data structure may indicate characteristics associated with the UI component. The data structure may support efficient similarity analysis between UI components. For example, the first data structure and a second data structure representative of a second UI component and indicative of one or more second characteristics of the second UI component may be processed to obtain similarity values. If one or more similarity values are greater than a threshold, then an indication may be transmitted. For example, an indication of the characteristic that is similar may be transmitted to a user and/or another system or service.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
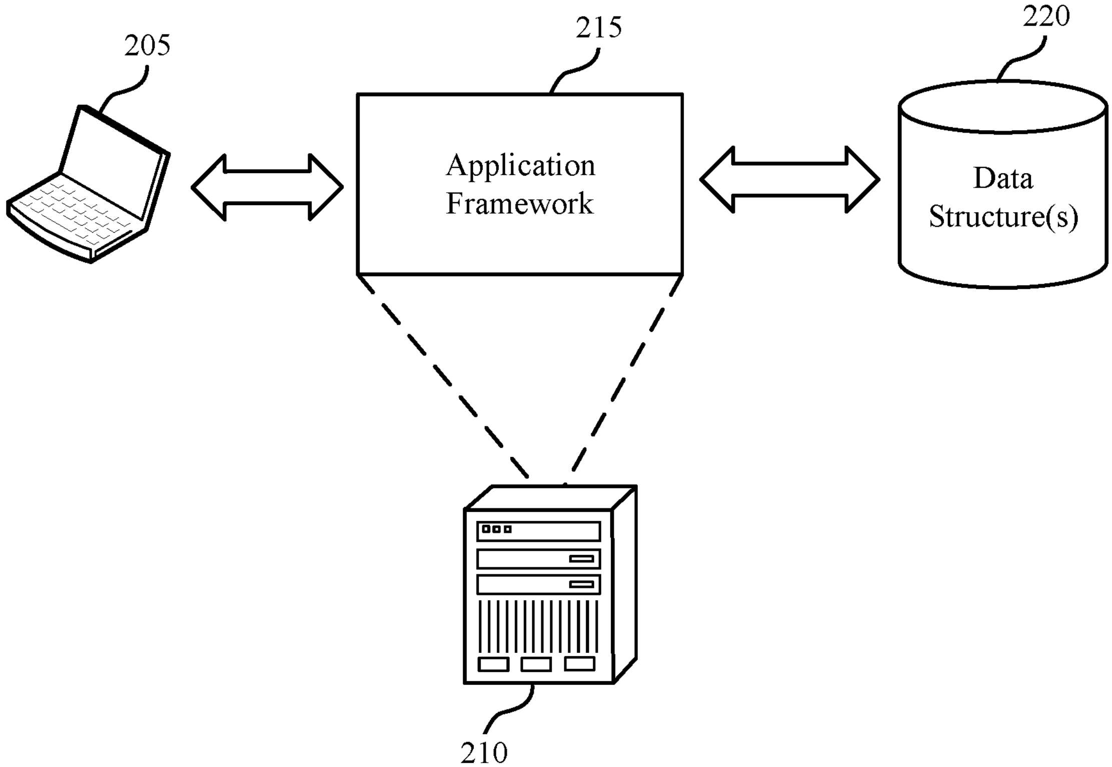
FIG. 2 shows an example of a computing environment that supports component characteristics similarity comparison in accordance with aspects of the present disclosure.

FIG. 2 shows an example of a computing environment 200 that supports component characteristics similarity comparison in accordance with aspects of the present disclosure. The computing environment 200 includes a user device 205, a server 210, and a datastore 220. The user device 205 may be an example of a user computing device associated with a client 105 of FIG. 1. The server 210 may represent, include, or support aspects of the cloud platform 115 of FIG. 1. The datastore 220 may be an example of the data center 120 of FIG. 1. As described with respect to FIG. 1, the server 210 may support an application framework 215 that may be used to design, maintain, and deploy applications that are accessible via user computing device such as computing devices associated with contacts 110. For example, an administrator of a cloud client 105 may access the application framework 215 via the user device 205 to design and deploy a web application that is accessed by other users associated with the cloud client 105, such as employees or customers.

The application framework 215 may access or use the datastore 220 or another datastore that stores various UI components that may be implemented in the application. For example, the user may access the application framework to design UI components and/or to utilize predesigned UI components for implementation into an application. Each UI component may be defined by style language (e.g., Cascading Style Sheets (CSS)), markup language, HyperText Markup Language (HTML), and Extensible Markup Language (XML)), and behavior language (e.g., JavaScript). These various languages, in conjunction, may define characteristics of the UI component, such as visual design, an interaction behavior (e.g., including visual behavior and internal state), etc. Thus, in some examples, a UI component may be referred to as a unit of logic that encompasses a set of behaviors in a specific fashion. The set of behaviors may include structure behavior, user interaction behavior, event/callback behavior, configurable behavior, and state behavior. Additionally, for any given component, a finite combination of behaviors may be exist for a UI component.

As such, for a set of given components, there may be overlapping characteristics, meaning that some components may have the same or similar behaviors. Many different users and organizations (e.g., cloud clients 105) implementing applications using the application framework 215 may result in a relatively large quantity of UI components such that many components share characteristics or have overlapping characteristics. As a result, significant memory and/or storage (e.g., in the datastore 220) may be attributed to storing components with similar or overlapping characteristics and a higher utilization of server resources may be used to register, validate, and provide component information. Further, the multitude of components may result in significant component maintenance overhead (e.g., when a change is repeated for each similar component). Additionally, the use of similar components in runtime may result in degradation of runtime performance as a client (e.g., a browser of a user device) may download more component information (e.g., style, markup, and behavior language) from a server, such as server 210. Additionally, the similar or overlapping components may result in inconsistent customer experience as similar components may have slight variations in look and behavior. Finally, the multitude of components may result in confusion to an engineer on which components to leverage or utilize for an application. Accordingly, it may be desirable for techniques to identify UI component similarity.

Techniques described herein support identification of component similarity To identify component similarity, the server 210 may process various UI components and generate a data structure for each UI component. The data structure may be an example of a tree data structure, where each leaf node represents a different behavior. The server 210 may parse the language defining the UI component to identify patterns and extract the behaviors. After generating the node, the server 210 may compare the behaviors of one component to the behaviors of another component to generate a similarity score. If the similarity score is greater than a threshold, then the server 210 may transmit an indication of one or more characteristics, the UI component, etc. The indication may be transmitted to a user, such as the user of the user device 205, such as to consolidate or remove similar components.

Further, the generated data structures, along with similarity scores, may be persisted in storage (e.g., the datastore 220) with relevant indices (e.g., the name of components) for quick retrieval. Persisting such information allows for similarity scores to be efficiently computed for other components or for recalculation based on changes to a component.

Figure 3:
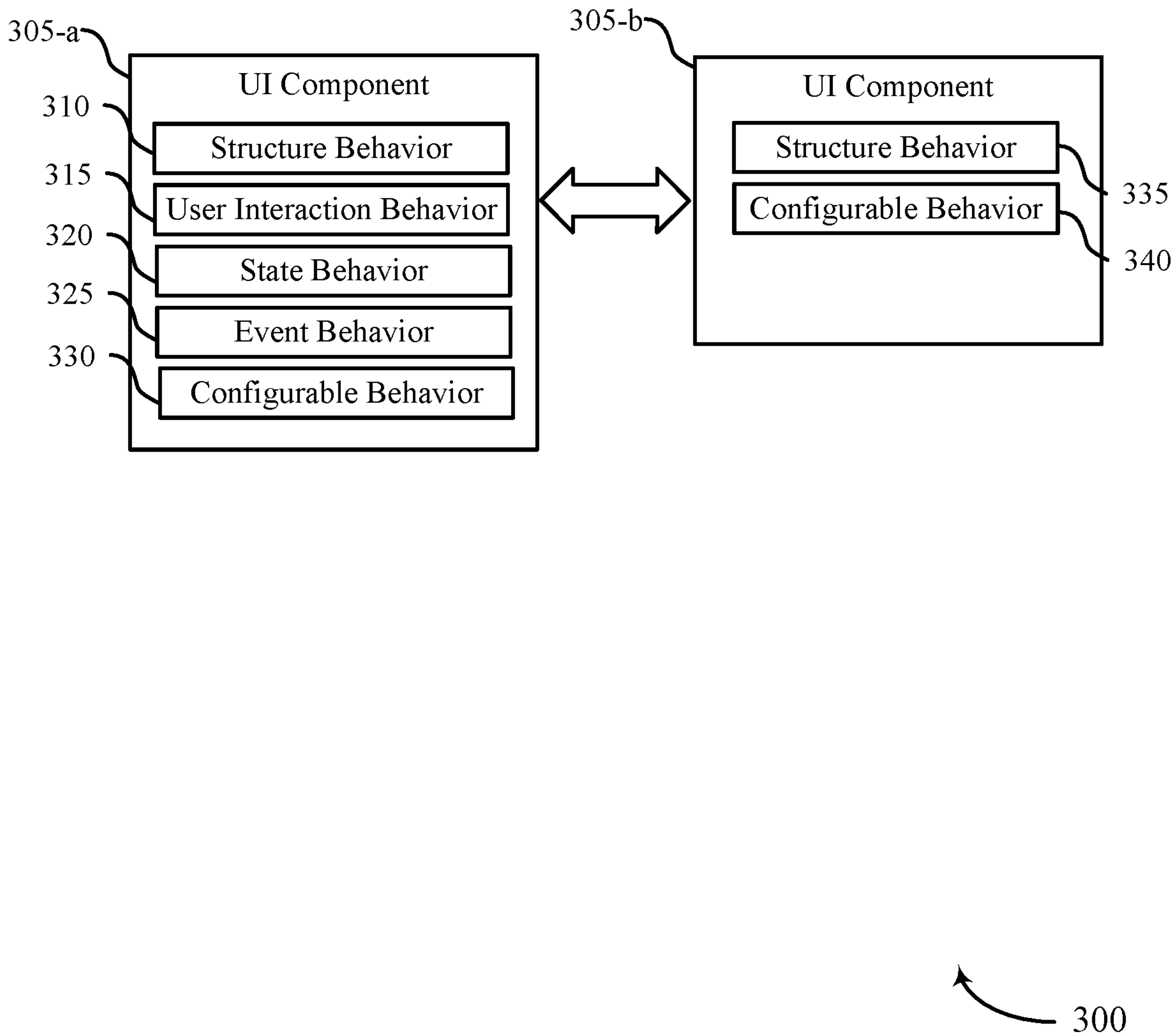
FIG. 3 shows an example of a component comparison diagram that supports component characteristics similarity comparison in accordance with aspects of the present disclosure.

FIG. 3 shows an example of a component comparison diagram 30) that supports component characteristics similarity comparison in accordance with aspects of the present disclosure. The component comparison diagram 300 includes a UI component 305-*a* and a UI component 305-*b*. The UI components are defined by or include a set of behaviors. As described herein, a server (e.g., server 210 of FIG. 2) may process the UI components 305 to extract and identify the behaviors and create a data structure representative of the UI components.

As noted herein, the set of behaviors may include structure behavior, user interaction behavior, event/callback behavior, configurable behavior, and state behavior. A structure behavior may capture HTML tag structure, accessibility attributes, CSS declaration, and condition logic. Condition logic may include loops, if-else statements, etc. An example structure behavior is defined as follows and includes CSS structure definition:

```
<!-- markup structure -->
<div span="uniqueStyle">Hello World</div>
```

A user interaction behavior may capture user triggerable events, such as mouse events, keyboard events, etc. An example user interaction behavior is as follows:

```
<button onclick="doSomething( )">Click me</button>
```

An event/callback behavior may capture non-user triggered events as component reacts or emits, such as, for example, CustomEvent, PostMessage, Listener, etc. An example event/callback behavior is as follows:

```
<script>
  window.addEventListener('load', (event) => {console.log('Load Event
Happened')});
</script>
```

A configurable behavior captures public configurable properties that a component receives, such as attributes, slots, etc. An example configurable behavior is as follows:

```
//Example in Lightning Web Component syntax
export default class extends LightningElement {
   @api propA;
}
<custom-component prop-a="12344">
<slot>
Hello World
</slot>
</custom-component>
```

A state behavior captures the internal state of a component. An example state behavior is as follows:

```
//Example is Lightning Web Component syntax
export default class extends LightningElement {
   __innerPropA;
   get innerPropA( ) {
      return this.__innerPropA;
   }
}
```

Additionally, for any given component, a finite combination of behaviors may exist for a UI component, and a combination of behaviors may inform the generated structure (e.g., tree structure), which may be referred to as a behavior relationship. There may be a maximum quantity of relationship chains, because, theoretically, at some point, the user may not interact (e.g., a pause) and a new chain may be started. Example chain structures are shown below:

Two Level Chaining
- User Interaction→Structure
- Event→Structure
- Event→State
- State (No Declaration)→Structure
- Configurable→Structure Three Level Chaining
- Event→State→Structure
- User Interaction→State→Structure
- User Interaction→Event→State Four Level Chaining
- User Interaction→Event→State→Structure
- User Interaction→State→Event→Structure Five Level Chaining
- User Interaction→State→Event→State→Structure
- User Interaction→Event→State→Event→Structure To extract the behaviors, the server processes the language defining the UI components. The language defining the UI components may include a set of string features that collectively include the code (e.g., the language) that defines the component. A parser may be configured to parse various aspects of the code to identify code snippets that define behaviors of the UI component. Thus, collectively, a set of string features make up the code that defines the UI component, and a parser processes the set of string features to identify code snippets that define one or more behaviors. As described herein, the parsing of the string features may include evaluation and parsing of style (e.g., CSS and HTML) as well as JavaScript. Processing includes parsing the language and generating a data structure (e.g., a tree structure) that defines the relationships and the behaviors.

The following example includes components that represent a checker game. In this checker game, there are two main components: a board and an individual checker piece. The code below may be referred to as a set of string features which are parsed and identified to generate the data structures.

```
/* checker piece style definition */
.red.man::after {
   content: url(.)
}
.black.man::after {
   content: url(.)
}
.red.king::after {
   content: url(.)
}
.black.king::after {
   content: url(.)
}
div:active {
   //active style
}
div:hover {
   //hover style
}
<!-- checker piece markup -->
<template>
   <div onclick={handleClick} class={colorClazz}></div>
</template>
/* checker piece javascript definition */
class CheckerPiece extends HTMLElement {
   __color;
   __type;
   __captured;
   __location;
   constructor( ) {
      this.__captured = false
```

-continued

```
      }
    updateState(event) {
      if (event.detail) {
        const {captured, type, location} = event.detail
      if (captured) {
        this._captured = true
      } else {
        if (type !== this._type) {
          this._type = type
        }
      this._location = location
      }
      }
    }
    handleClick(event) {
      new CustomEvent('piece-click', {detail:
        {location: this._location, type: this._type}}).fire( )
    }
    get colorClazz( ) {
      return '${this._color}, ${this._type}'
    }
    connectedCallback( ) {
      this._color = this.getAttribute('color')
      this._type = this.getAttribute('type')
      this._location = this.getAttribute('data-location')
      }
    }
```

For this checker game, the server, via the parsing according to techniques described herein, may identify the following behaviors as set forth in Table 1:

TABLE 1

| Type | Reference | Description |
|---|---|---|
| structure | <div></div> | content with <template></template> |
| structure | div:active | active style definition |
| structure | div:hover | hover style definition |
| structure | .red.man::after | 'red.man' style definition |
| structure | .red.king::after | 'red.king' style definition |
| structure | .black.man::after | 'black.man' style definition |
| structure | .black.king::after | 'black.king' style definition |
| user interaction | active | user triggerable event within the structure |
| user interaction | hover | user triggerable event within the structure |
| user interaction | onclick | user triggerable event within the structure |
| event | piece-click(custom event) | custom event fired |
| event | updateState(custom event) | custom event handler |

TABLE 1-continued

| Type | Reference | Description |
|---|---|---|
| configurable | color | public attribute |
| configurable | type | public attribute |
| configurable | location | public attribute |
| state | captured | internal state, not accessible to public |
| state | colorClazz | internal function, not accessible to public |
| state | constructor | default internal state |

These behaviors may then be preserved in storage based on the behavior. The following Table 2 illustrates example metadata fields (e.g., that may be preserved in a database such as datastore 220) based on information identified from the code (e.g., string features) set forth above:

TABLE 2

| Name | Example | Description |
|---|---|---|
| ComponentId | Checker-piece | Unique identifier for a specific component. The identifier may be auto-assigned or manually entered. |
| LineId | 8e8325f5 | Unique identifier for the first line of the definition. (CRC32 Hash in this case) |
| ContentId | 8e8325f5 | Unique identifier for the complete definition of the content |

The following Table 3 illustrates an example data structure that includes information about components identified from the code (e.g., string features) set forth above, and this data structure may be preserved in memory storage (e.g., the datastore 220):

TABLE 3

| Id | Path | LastModifiedDate |
|---|---|---|
| Checker-piece | /components/check-piece | Jun. 13, 2023 |

The following Table 4 illustrates an example data structure that includes information about a structure behaviors identified from the code (e.g., string features) set forth above, and this data structure may be preserved in memory storage (e.g., the datastore 220):

TABLE 4

| Id | ComponentId | LineId | Type | ContentId | Detail |
|---|---|---|---|---|---|
| 1 | checker-piece | 8e8325f5 | Markup | 8e8325f5 | div onclick={handleClick} class={colorClazz}></div> |
| 2 | checker-piece | c3ee0ac8 | CSS | 489c0258 | red.man::after { content: url(.) } |
| 3 | checker-piece | 76113416 | CSS | f786aa59 | black.man::after { content: url(.) } |
| 4 | checker-piece | d2e0cbcd | CSS | cd657c3e | red.king::after { content: url(.) } |
| 5 | checker-piece | 31be21de | CSS | 7ac7a792 | black.king::after { content: url(.) } |

TABLE 4-continued

| Id | ComponentId | LineId | Type | ContentId | Detail |
|---|---|---|---|---|---|
| 6 | checker-piece | 14e72192 | CSS | df0ea057 | div:active{ //active style }: |
| 7 | checker-piece | 9ca8e872 | CSS | e7b3836d | div:hover{ //active style }: |

The following Table 5 illustrates an example data structure that includes information about user interaction behaviors identified from the code (e.g., string features) set forth above, and this data structure may be preserved in memory storage (e.g., the datastore 220):

TABLE 5

| Id | ComponentId | LineId | Type | EventName | TargetId | ContentId | Detail |
|---|---|---|---|---|---|---|---|
| 1 | checker-piece | 8e8325f5 | Mouse | click | 1 | 67fe2040 | handleClick(event) { new CustomEvent('piece-click', {detail: {location: this._location, type: this._type}}). |
| 2 | checker-piece | 14e72192 | Mouse | active | 1 | df0ea057 | div:active{ //active style }: |
| 3 | checker-piece | 9ca8e872 | Mouse | Hover | 1 | e7b3836d | div:hover{ //hover style }: |

The following Table 6 illustrates an example data structure that includes information about event/callback behaviors identified from the code (e.g., string features) set forth above, and this data structure may be preserved in memory storage (e.g., the datastore 220). Note that this table does not include a "detail" column for the sake of readability, but this column may be included in some implementations:

TABLE 6

| Id | ComponentId | LineId | Type | ContentId | EventName | Action | Properties |
|---|---|---|---|---|---|---|---|
| 1 | checker-piece | 4ab06f88 | CustomEvent | 7cc290a5 | piece-click | Invoke | this._location, this._type |
| 2 | checker-piece | 43413db4 | CustomEvent | e4383767 | | Handler | this._captured, this._location, this_type |

The following Table 7 illustrates an example data structure that includes information about configurable behaviors identified from the code (e.g., string features) set forth above, and this data structure may be preserved in memory storage (e.g., the datastore 220):

TABLE 7

| Id | ComponentId | LineId | Type | ContentId | Name | Detail |
|---|---|---|---|---|---|---|
| 1 | checker-piece | 0727efde | Attribute | 0727efde | _color | _color |
| 2 | checker-piece | a1b774ba | Attribute | a1b774ba | _type | _type |
| 3 | checker-piece | 705eccab | Attribute | 705eccab | _location | _location |

The following Table 8 illustrates an example data structure that includes information about state behaviors identified from the code (e.g., string features) set forth above, and this data structure may be preserved in memory storage (e.g., the datastore 220):

TABLE 8

| Id | ComponentID | LineId | Type | ContentId | Name | Detail |
|---|---|---|---|---|---|---|
| 1 | checker-piece | 66f6e7fd | Property | 66f6e7fd | __captured | __captured |
| 2 | checker-piece | cf1f3784 | Function | bc07bf89 | colorClazz | get colorClazz( ) { return '${this.__color}, ${this.__type}' } |
| 3 | checker-piece | add02d20 | Function | bc4006a9 | constructor | constructor( ) { this.__captured = false } |

The following Table 9 illustrates an example data structure that includes information about relationship behaviors identified from the code (e.g., string features) set forth above, and this data structure may be preserved in memory storage (e.g., the datastore 220):

TABLE 9

| Id | ComponentId | Nodes | Detail |
|---|---|---|---|
| 1 | checker-piece | User Interaction 2 → Structure 6 | Active state result in style change |
| 2 | checker-piece | User Interaction 3 → Structure 7 | Hover state result in style change |
| 3 | checker-piece | User Interaction 1 → Event 1 | Onclick result in custom event fired |
| 4 | checker-piece | Configurable 1, 2 → State 2 → Structure 2, 3, 4, 5 | Attributes used in updating class declaration, which result in style change |
| 5 | checker-piece | Event 2 → Configurable 2, 3 & State 1 → State 2 → Structure 2 - 5 | Event handler updates attributes that result in style change |

Thus, each of these above tables include information about characteristics (e.g., visual design, interaction behaviors) that may be identified based on processing of string features (e.g., language) defining one or more UI components. After processing the string features, the system may generate one or more data structures (e.g., as illustrated in the table above) that are indicative of the behaviors/characteristics for the UI component The system may then compare the data structures corresponding to UI components to calculate a similarity score for the UI component. For example, for UI components B and A, the calculation may be performed as follows, which may be an example of a multi-line regression formula:

$$\text{Component Similarity}_{B\to A} = \frac{\sum (\text{Behavior}\,|\text{Relationship Similarity}_{B\to A})}{\text{Number of Behavior}\,|\,\text{Relationship}_B}$$

Due to various component shapes, characteristics, etc., matching results may not be transitive. In FIG. 3, component 305-*a* is identified as including five behaviors, including structure behavior 310, user interaction behavior 315, state behavior 320, event behavior 325, and configurable behavior 330. UI component 305-*b* includes structure behavior 335 and configurable behavior 340. Assuming both UI component 305-*a* and UI component 305-*b* have identical structure behaviors (e.g., structure behaviors 310 and 335) and identical configurable behaviors (e.g., configurable behavior 330 and configurable behavior 340), then the similarity result may be as follows:

Component A→Component B=0.20

Component B→Component A=1

When the system does not contain information about the component or framework, the system may use the above equation to determine a naïve similarity score. As the system obtains more data, the existing dataset may be used to filter out behavior or relationship data that does not impact the end result. Accordingly, the system may perform the following operations:

1. Extract behaviors and relationships for both components.
2. Filter unrelated behaviors/relationships.
3. Calculate behavior similarity based on type.
4. Calculate relationship similarity based on nodes.
5. Store the results of 3 and 4.
6. Calculate component similarity.

In some cases, a component definition may be modified. In cases where a component definition is changed, the system may process the UI component definition (e.g., language) to extract and identify behaviors. Relationship data structures may not be recomputed yet. The system may then compare the new and existing behaviors and perform the following operations:

1. Add any new behavior.
2. Remove any behavior that is no longer applicable.

For any new behavior introduced, the system may compute the new relationship tree (e.g., tree data structure). In parallel, the system may remove any relationships that contain the removed behavior. Thereafter, the updated behavior is recomputed (e.g., in terms of similarity) in the system.

Figure 4:
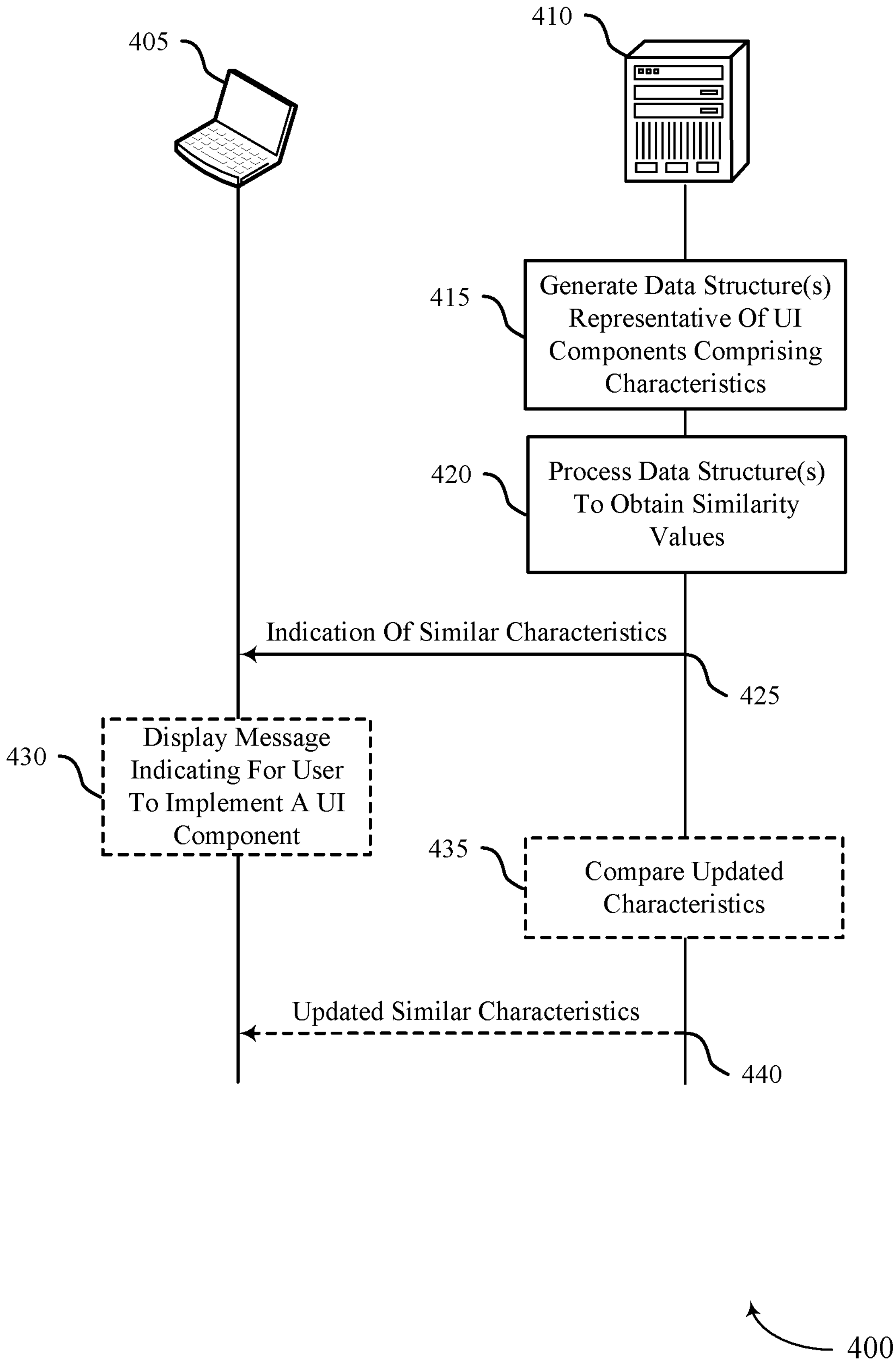
FIG. 4 shows an example of a process flow that supports component characteristics similarity comparison in accordance with aspects of the present disclosure.

FIG. 4 shows an example of a process flow 400 that supports component characteristics similarity comparison in accordance with aspects of the present disclosure. The process flow 400 includes a user device 405 and a server 410, which may be examples of the corresponding devices as described with respect to FIGS. 1 through 3. For example, the user device 405 may be an example of the user device 205 of FIG. 2, and the server 410 may be an example of the server 210 of FIG. 2. In the following description of the process flow 400, operations may be added, omitted, or performed in a different order (with respect to the exemplary order shown).

At 415, the server 410 may generate a first data structure representative of a first user interface component of a plurality of user interface components configured for generating applications accessible via a user device and associated with respective characteristics corresponding to a visual design, an interaction behavior, or both for a user interface component. The first data structure indicative of one or more first characteristics (e.g., behaviors) corresponding to the first user interface component. For example, the server 410 may process a set of user interface components that are associated with or supported by an application framework. In some examples, a user interface component may be processed in response to a change to the user interface component, creation or design of the user interface component, etc. The generated first data structure may be an example of a tree data structure, where one or more leaf nodes of the tree data structure correspond to the first characteristics. The arrangement of the leaf nodes in the leaf data structure may be dependent on the extracted relationship between behaviors.

To generate the data structure, the server 410 may obtain a plurality of string features of the first user interface component based at least in part on parsing information (e.g., code such as CSS, HTML, and JavaScript) corresponding to the first user interface component. The server 410 may parse the string features to identify, behaviors/characteristics. The visual design, the interaction behavior, or both may include one or more of a structure behavior, a user interaction behavior, an event behavior, a configurable behavior, a state behavior, or a relationship behavior, as described herein.

At 420, the server 410 may process, to obtain one or more similarity values, the first data structure representative of the first user interface component and a second data structure representative of a second user interface component and indicative of one or more second characteristics corresponding to the second user interface component. The second data structure may be a second tree data structure with one or more second leaf nodes corresponding to the one or more second characteristics. Processing the first data structure and the second data structure may include traversing the first tree data structure and the second tree data structure to compare the one or more first leaf nodes to the one or more second leaf nodes. In some examples, obtaining the similarity values may include comparing, in accordance with a multiline regression formula and a machine learning model, one or more first values associated with the first data structure to one or more second values associated with the second data structure. Additionally, comparing the first data structure and the second data structure may include obtaining a respective similarity value of a plurality of similarity values based at least in part on comparing a first respective node of a first plurality of nodes of the first data structure to a second respective node of a second plurality of nodes of the second data structure and computing the one or more similarity values based at least in part on a numerical quantity of the first plurality of nodes and the plurality of similarity values.

At 425, the server 410 may transmit (e.g., to the user device 405) an indication of a first characteristic of the one or more first characteristics from the first data structure based at least in part on a respective similarity value corresponding to the first characteristic and a second characteristic of the one or more second characteristics satisfying a threshold similarity value. For example, two or more characteristics (or the UI components as a whole) are similar above a threshold, then a user may be notified such that the user may use an existing component or such that a component may be removed thereby saving memory and processing resources.

At 430, transmitting the indication may cause display, via a user interface (e.g., the user interface of the user device 405), of a message indicating to a user to implement the first user interface component, the second user interface component, or both in accordance with the one or more similarity values.

At 435, the server 410 may detect that a component has been updated. In such cases, the server 410 may obtain a plurality of string features of the first user interface component, where the plurality of string features comprise one or more third characteristics corresponding to the first user interface component (e.g., the third characteristics are different from the first characteristics previously identified). The server 410 may determine that at least one characteristic of the one or more first characteristics corresponding to the first user interface component has been modified based at least in part on comparing the one or more third characteristics to the one or more first characteristics. The server 410 may generate a third data structure representative of the first user interface component, the third data structure indicative of the one or more third characteristics. The server 410 may also add a third characteristics of the one or more third characteristics to the first data structure based at least in part on determining the third characteristic is new to the user interface component or remove a third characteristic of the one or more first characteristics from the first data structure based at least in part on determining that the third characteristic is excluded from the one or more third characteristics. At 440, the server 410 may transmit an indication of the updated similar characteristics.

Figure 5:
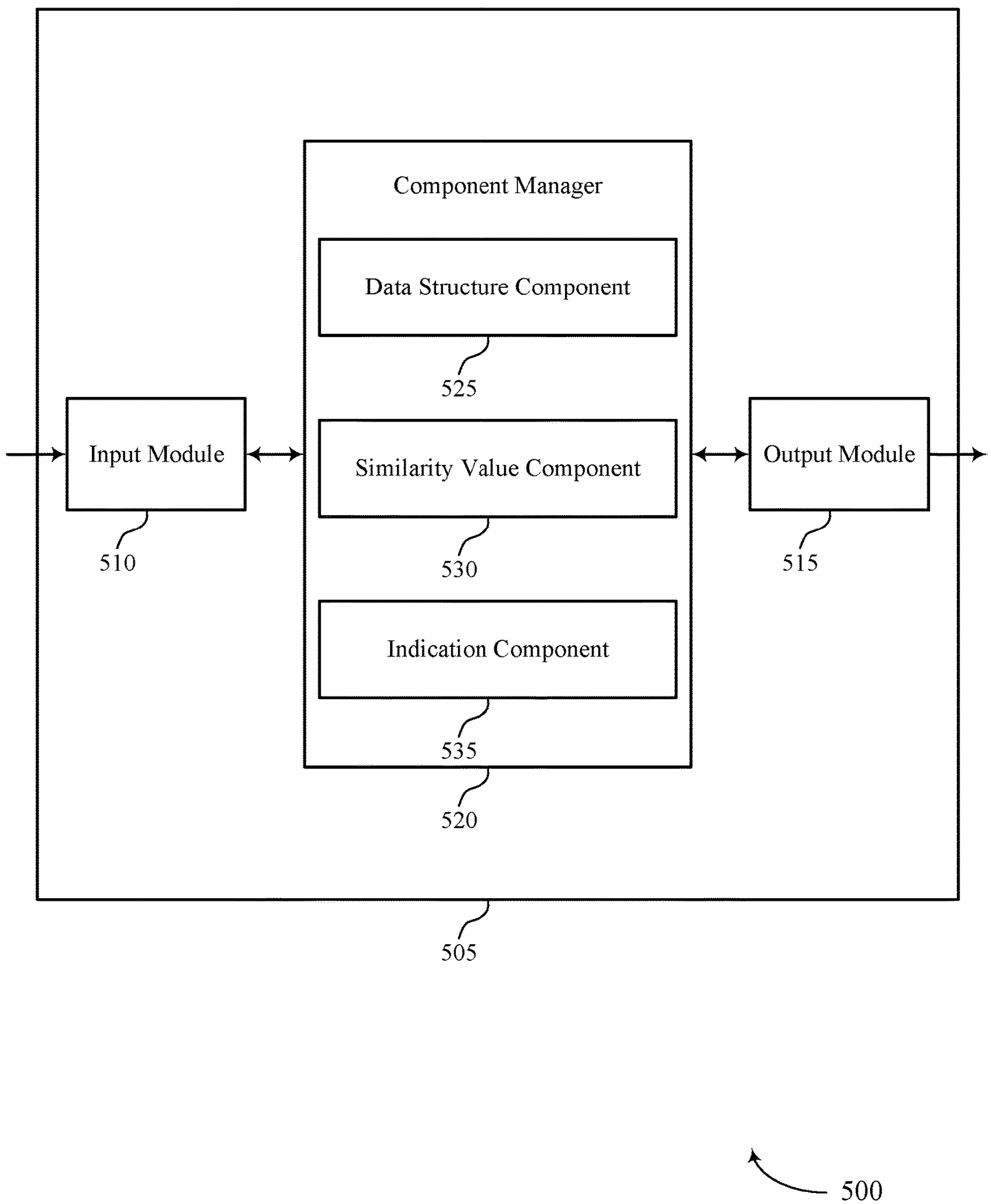
FIG. 5 shows a block diagram of an apparatus that supports component characteristics similarity comparison in accordance with aspects of the present disclosure.

FIG. 5 shows a block diagram 500 of a device 505 that supports component characteristics similarity comparison in accordance with aspects of the present disclosure. The device 505 may include an input module 510, an output module 515, and a component manager 520. The device 505, or one of more components of the device 505 (e.g., the input module 510, the output module 515, and the component manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/29®, UNIX®, LINUX®, or another known operating system to handle input signals. The input module 510 may send aspects of these input signals to other components of the device 505 for processing. For example, the input module 510 may transmit input signals to the component manager 520 to support component characteristics similarity comparison. In some cases, the input module 510 may be a component of an I/O controller 710 as described with reference to FIG. 7.

The output module 515 may manage output signals for the device 505. For example, the output module 515 may receive signals from other components of the device 505, such as the component manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the component manager 520 may include a data structure component 525, a similarity value component 530, an indication component 535, or any combination thereof. In some examples, the component manager 520, or various components thereof, may be configured to perform various operations (e.g., receiving, monitoring, transmitting) using or otherwise in cooperation with the input module 510, the output module 515, or both. For example, the component manager 520 may receive information from the input module 510, send information to the output module 515, or be integrated in combination with the input module 510, the output module 515, or both to receive information, transmit information, or perform various other operations as described herein.

The data structure component 525 may be configured as or otherwise support a means for generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The similarity value component 530 may be configured as or otherwise support a means for processing, to obtain one or more similarity values, the first data structure representative of the first user interface component and a second data structure representative of a second user interface component and indicative of one or more second characteristics corresponding to the second user interface component. The indication component 535 may be configured as or otherwise support a means for transmitting an indication of a first characteristic of the one or more first characteristics from the first data structure based on a respective similarity value corresponding to the first characteristic and a second characteristic of the one or more second characteristics satisfying a threshold similarity value.

Figure 6:
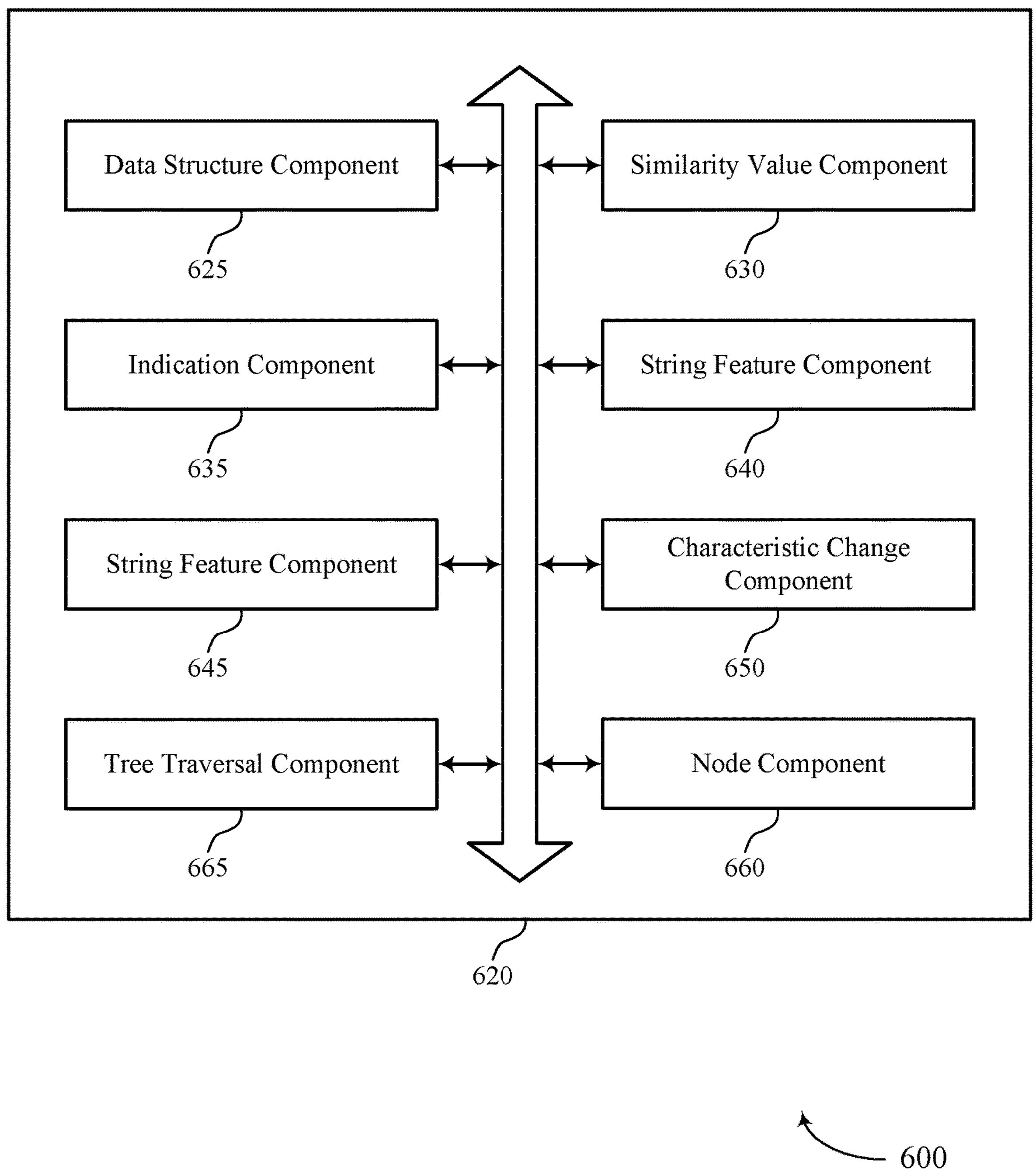
FIG. 6 shows a block diagram of a component manager that supports component characteristics similarity comparison in accordance with aspects of the present disclosure.

FIG. 6 shows a block diagram 600 of a component manager 620 that supports component characteristics similarity comparison in accordance with aspects of the present disclosure. The component manager 620 may be an example of aspects of a component manager or a component manager 520, or both, as described herein. The component manager 620, or various components thereof, may be an example of means for performing various aspects of component characteristics similarity comparison as described herein. For example, the component manager 620 may include a data structure component 625, a similarity value component 630, an indication component 635, a string feature component 640, a string feature component 645, a characteristic change component 650, a node component 660, a tree traversal component 665, or any combination thereof. Each of these components, or components of subcomponents thereof (e.g., one or more processors, one or more memories), may communicate, directly or indirectly, with one another (e.g., via one or more buses).

The data structure component 625 may be configured as or otherwise support a means for generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The similarity value component 630 may be configured as or otherwise support a means for processing, to obtain one or more similarity values, the first data structure representative of the first user interface component and a second data structure representative of a second user interface component and indicative of one or more second characteristics corresponding to the second user interface component. The indication component 635 may be configured as or otherwise support a means for transmitting an indication of a first characteristic of the one or more first characteristics from the first data structure based on a respective similarity value corresponding to the first characteristic and a second characteristic of the one or more second characteristics satisfying a threshold similarity value.

In some examples, to support processing the first data structure representative of the first user interface component and the second data structure representative of the second user interface component, the similarity value component 630 may be configured as or otherwise support a means for obtaining a respective similarity value of a set of multiple similarity values based on comparing a first respective node of a first set of multiple nodes of the first data structure to a second respective node of a second set of multiple nodes of the second data structure. In some examples, to support processing the first data structure representative of the first user interface component and the second data structure representative of the second user interface component, the similarity value component 630 may be configured as or otherwise support a means for computing the one or more similarity values based on a numerical quantity of the first set of multiple nodes and the set of multiple similarity values.

In some examples, the comparing includes a string comparison.

In some examples, the string feature component 640 may be configured as or otherwise support a means for obtaining a set of multiple string features of the first user interface component based on parsing information corresponding to the first user interface component, where generating the first data structure is based on determining the one or more first characteristics from the set of multiple string features of the first interface component.

In some examples, the string feature component 645 may be configured as or otherwise support a means for obtaining, after transmitting the indication of the first characteristic, a set of multiple string features of the first user interface component based on parsing information corresponding to the first user interface component, where the set of multiple string features include one or more third characteristics corresponding to the first user interface component. In some examples, the characteristic change component 650 may be configured as or otherwise support a means for determining at least one characteristic of the one or more first characteristics corresponding to the first user interface component has been modified based on comparing the one or more third characteristics to the one or more first characteristics. In some examples, the data structure component 625 may be configured as or otherwise support a means for generating a third data structure representative of the first user interface component, the third data structure indicative of the one or more third characteristics.

In some examples, to support generating the third data structure, the node component 66) may be configured as or otherwise support a means for adding a third characteristic of the one or more third characteristics to the first data structure based on determining the third characteristic is new to the user interface component.

In some examples, to support generating the third data structure, the node component 660 may be configured as or otherwise support a means for removing a third characteristic of the one or more first characteristics from the first data structure based on determining that the third characteristic is excluded from the one or more third characteristics.

In some examples, the first data structure includes a first tree data structure with one or more first leaf nodes corresponding to the one or more first characteristics. In some examples, the second data structure includes a second tree data structure with one or more second leaf nodes corresponding to the one or more second characteristics.

In some examples, to support processing the first data structure representative of the first user interface component and the second data structure representative of the second user interface component, the tree traversal component 665 may be configured as or otherwise support a means for traversing the first tree data structure and the second tree data structure to compare the one or more first leaf nodes to the one or more second leaf nodes.

In some examples, to support obtaining the one or more similarity values, the similarity value component 630 may be configured as or otherwise support a means for comparing, in accordance with a multi-line regression formula and a machine learning model, one or more first values associated with the first data structure to one or more second values associated with the second data structure.

In some examples, the visual design, the interaction behavior, or both include one or more of a structure behavior, a user interaction behavior, an event behavior, a configurable behavior, a state behavior, or a relationship behavior.

In some examples, the indication component 635 may be configured as or otherwise support a means for displaying, via a user interface, a message indicating to a user to implement the first user interface component, the second user interface component, or both in accordance with the one or more similarity values.

Figure 7:
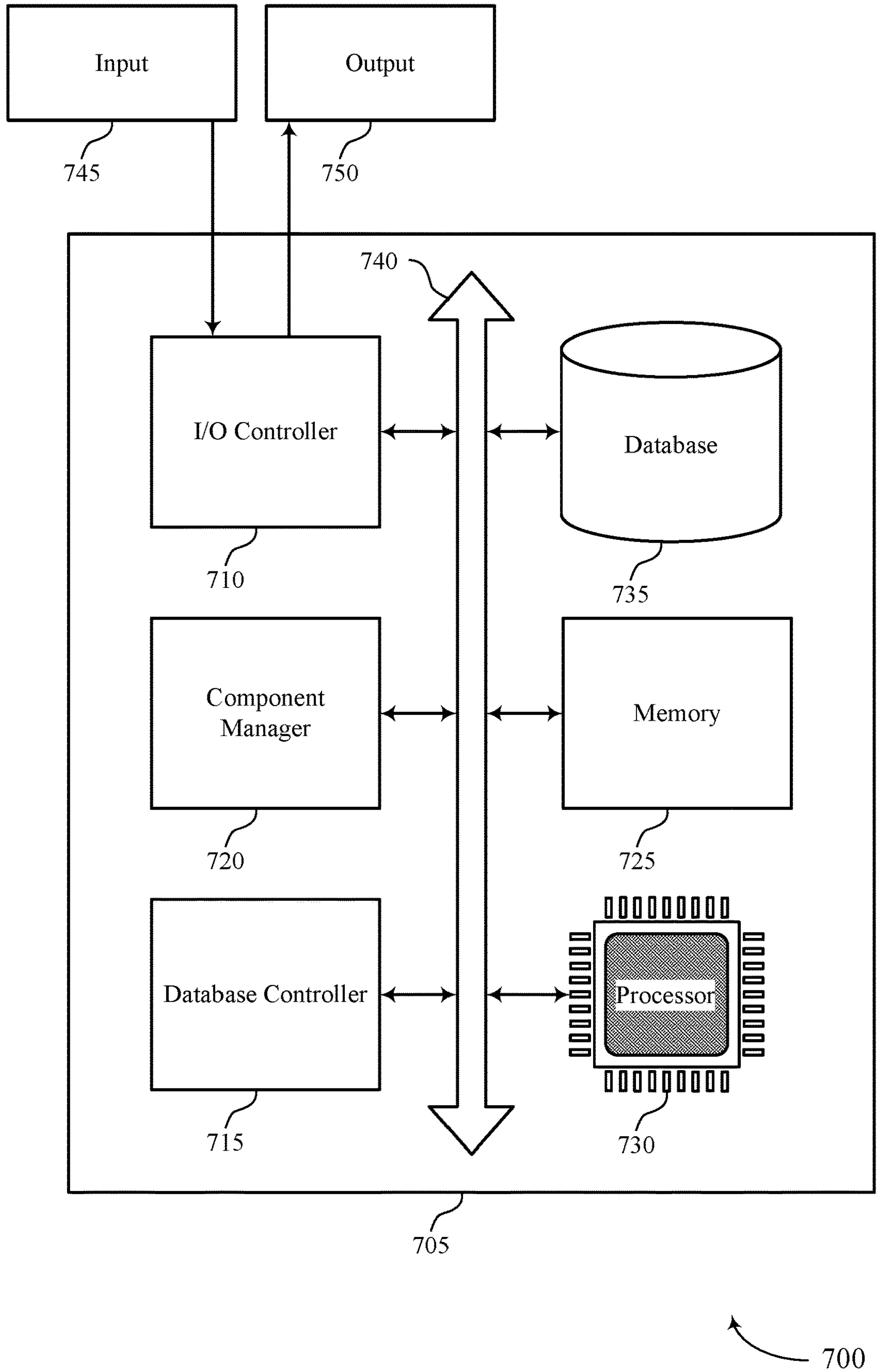
FIG. 7 shows a diagram of a system including a device that supports component characteristics similarity comparison in accordance with aspects of the present disclosure.

FIG. 7 shows a diagram of a system 700 including a device 705 that supports component characteristics similarity comparison in accordance with aspects of the present disclosure. The device 705 may be an example of or include the components of a device 505 as described herein. The device 705 may include components for bi-directional data communications including components for transmitting and receiving communications, such as a component manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause at least one processor 730 to perform various functions described herein. In some cases, the memory 725 may contain, among other things, a BIOS which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting component characteristics similarity comparison). The processor 730 may be an example of a single processor or multiple processors. For example, the device 705 may include one or more processors 730.

For example, the component manager 720 may be configured as or otherwise support a means for generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The component manager 720 may be configured as or otherwise support a means for processing, to obtain one or more similarity values, the first data structure representative of the first user interface component and a second data structure representative of a second user interface component and indicative of one or more second characteristics corresponding to the second user interface component. The component manager 720 may be configured as or otherwise support a means for transmitting an indication of a first characteristic of the one or more first characteristics from the first data structure based on a respective similarity value corresponding to the first characteristic and a second characteristic of the one or more second characteristics satisfying a threshold similarity value.

By including or configuring the component manager 720 in accordance with examples as described herein, the device 705 may support techniques for improved memory usage and reduced component maintenance overhead due to reduction of duplicative behaviors or characteristics. The device 705 may also support techniques for reduction of utilization of server resources to register, validate, and provide component information as well as improved user experience due to consistent component behavior.

Figure 8:
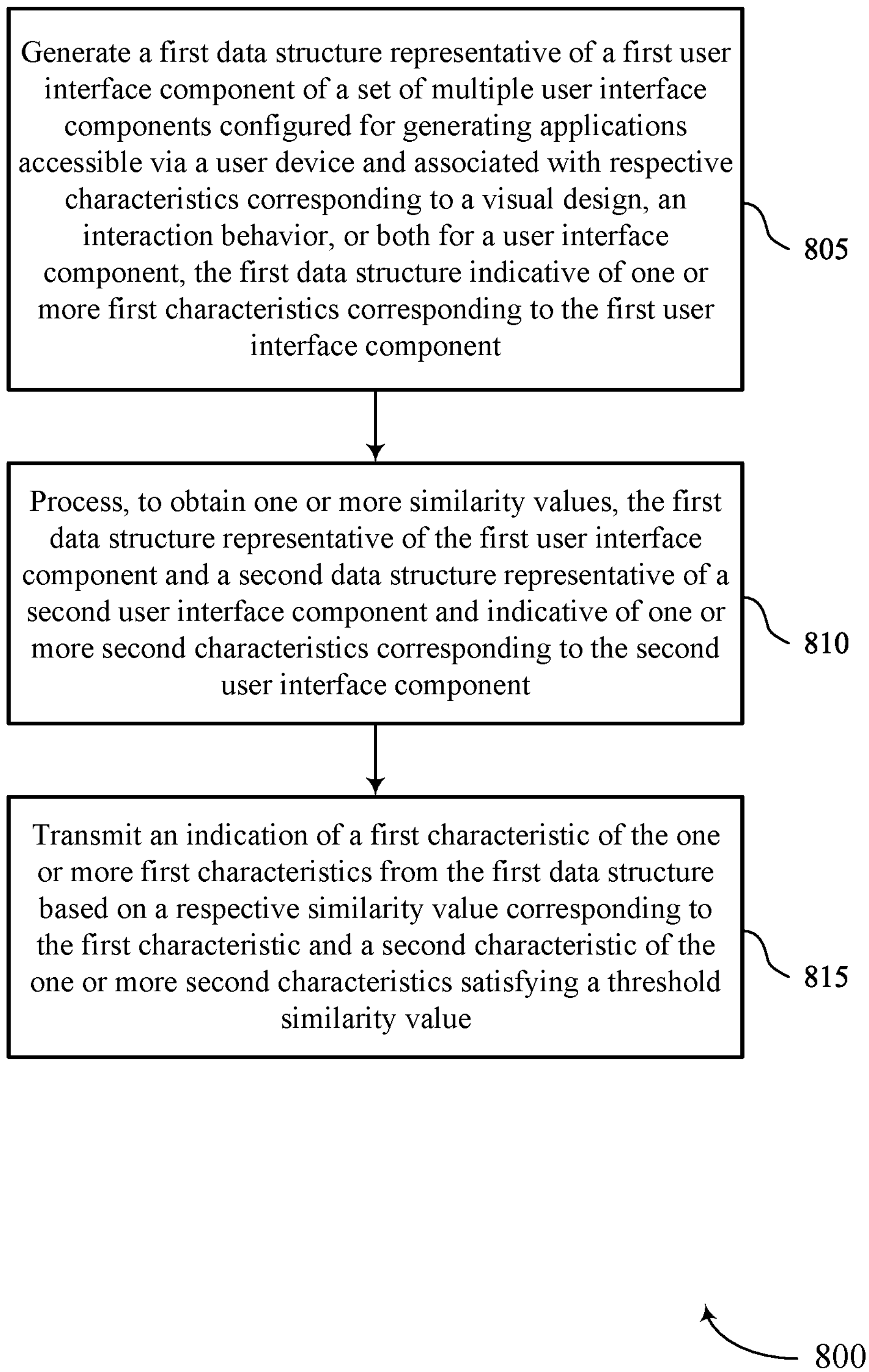
FIGS. 8 through 11 show flowcharts illustrating methods that support component characteristics similarity comparison in accordance with aspects of the present disclosure.

FIG. 8 shows a flowchart illustrating a method 800 that supports component characteristics similarity comparison in accordance with aspects of the present disclosure. The operations of the method 800 may be implemented by a Salesforce Device or its components as described herein. For example, the operations of the method 800 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 805, the method may include generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The operations of block 805 may be performed in accordance with examples as disclosed herein. In some examples, aspects of the operations of 805 may be performed by a data structure component 625 as described with reference to FIG. 6.

At 810, the method may include processing, to obtain one or more similarity values, the first data structure representative of the first user interface component and a second data structure representative of a second user interface component and indicative of one or more second characteristics corresponding to the second user interface component. The operations of block 810 may be performed in accordance with examples as disclosed herein. In some examples, aspects of the operations of 810 may be performed by a similarity value component 630 as described with reference to FIG. 6.

At 815, the method may include transmitting an indication of a first characteristic of the one or more first characteristics from the first data structure based on a respective similarity value corresponding to the first characteristic and a second characteristic of the one or more second characteristics satisfying a threshold similarity value. The operations of block 815 may be performed in accordance with examples as disclosed herein. In some examples, aspects of the operations of 815 may be performed by an indication component 635 as described with reference to FIG. 6.

Figure 9:
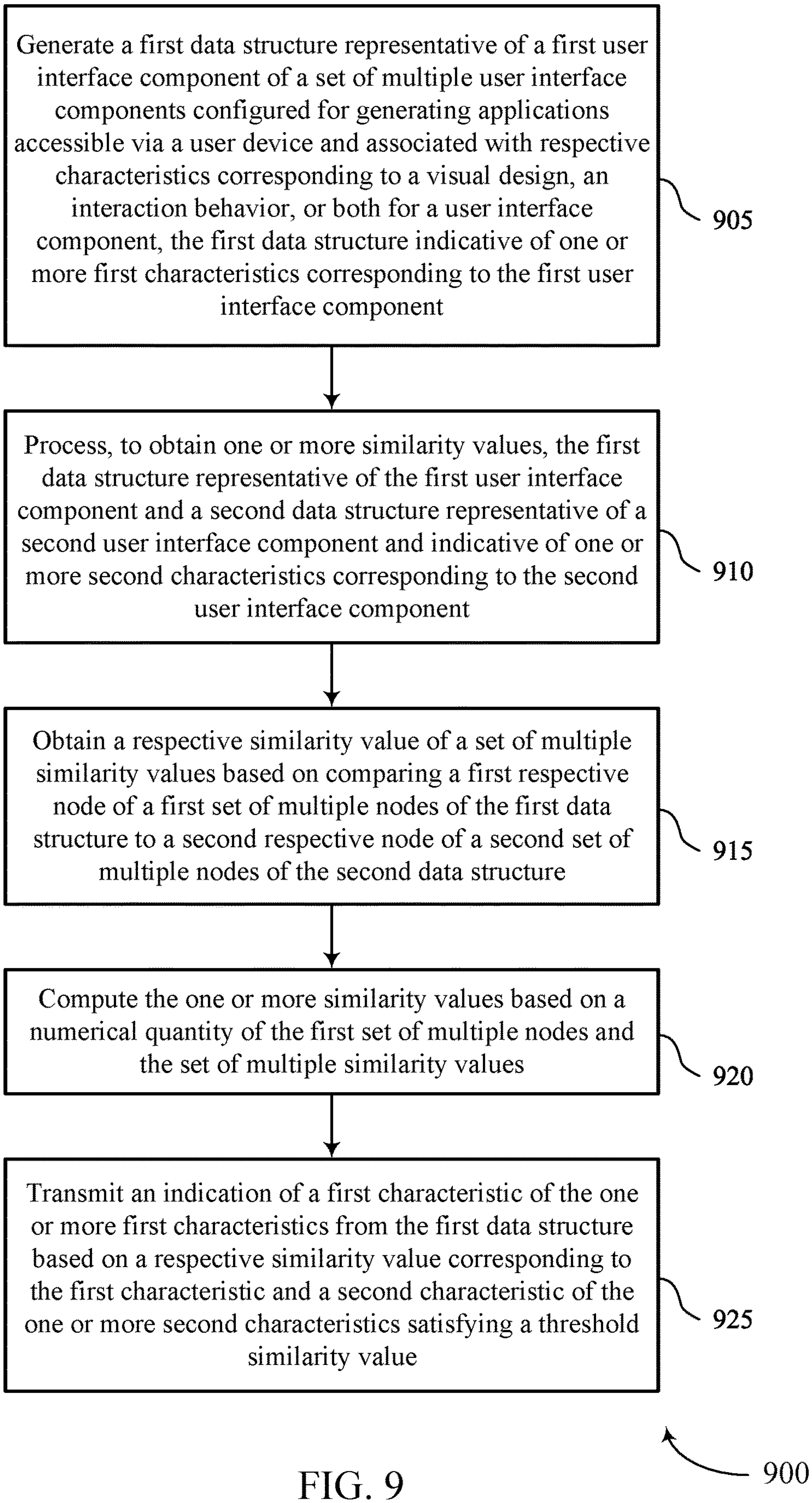

FIG. 9 shows a flowchart illustrating a method 900 that supports component characteristics similarity comparison in accordance with aspects of the present disclosure. The operations of the method 900 may be implemented by a Salesforce Device or its components as described herein. For example, the operations of the method 900 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 905, the method may include generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The operations of block 905 may be performed in accordance with examples as disclosed herein. In some examples, aspects of the operations of 905 may be performed by a data structure component 625 as described with reference to FIG. 6.

At 910, the method may include processing, to obtain one or more similarity values, the first data structure representative of the first user interface component and a second data structure representative of a second user interface component and indicative of one or more second characteristics corresponding to the second user interface component. The operations of block 910 may be performed in accordance with examples as disclosed herein. In some examples, aspects of the operations of 910 may be performed by a similarity value component 630 as described with reference to FIG. 6.

At 915, the method may include obtaining a respective similarity value of a set of multiple similarity values based on comparing a first respective node of a first set of multiple nodes of the first data structure to a second respective node of a second set of multiple nodes of the second data structure. The operations of block 915 may be performed in accordance with examples as disclosed herein. In some examples, aspects of the operations of 915 may be performed by a similarity value component 630 as described with reference to FIG. 6.

At 920, the method may include computing the one or more similarity values based on a numerical quantity of the first set of multiple nodes and the set of multiple similarity values. The operations of block 920 may be performed in accordance with examples as disclosed herein. In some examples, aspects of the operations of 920 may be performed by a similarity value component 630 as described with reference to FIG. 6.

At 925, the method may include transmitting an indication of a first characteristic of the one or more first characteristics from the first data structure based on a respective similarity value corresponding to the first characteristic and a second characteristic of the one or more second characteristics satisfying a threshold similarity value. The operations of block 925 may be performed in accordance with examples as disclosed herein. In some examples, aspects of the operations of 925 may be performed by an indication component 635 as described with reference to FIG. 6.

Figure 10:
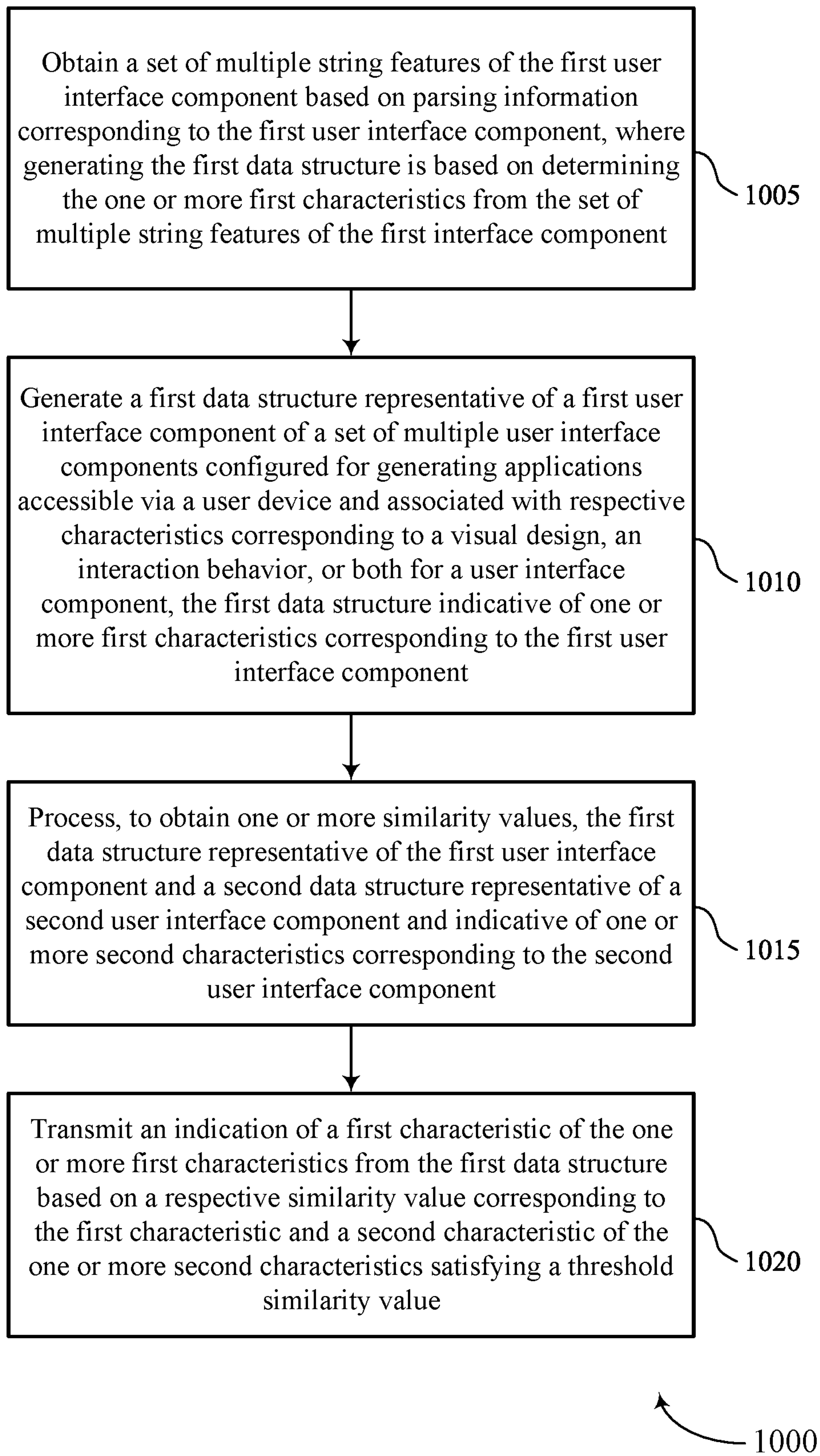

FIG. 10 shows a flowchart illustrating a method 1000 that supports component characteristics similarity comparison in accordance with aspects of the present disclosure. The operations of the method 1000 may be implemented by a Salesforce Device or its components as described herein. For example, the operations of the method 1000 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 1005, the method may include obtaining a set of multiple string features of the first user interface component based on parsing information corresponding to the first user interface component, where generating the first data structure is based on determining the one or more first characteristics from the set of multiple string features of the first interface component. The operations of block 1005 may be performed in accordance with examples as disclosed herein. In some examples, aspects of the operations of 1005 may be performed by a string feature component 640 as described with reference to FIG. 6.

At 1010, the method may include generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The operations of block 1010 may be performed in accordance with examples as disclosed herein. In some examples, aspects of the operations of 1010 may be performed by a data structure component 625 as described with reference to FIG. 6.

At 1015, the method may include processing, to obtain one or more similarity values, the first data structure representative of the first user interface component and a second data structure representative of a second user interface component and indicative of one or more second characteristics corresponding to the second user interface component. The operations of block 1015 may be performed in accordance with examples as disclosed herein. In some examples, aspects of the operations of 1015 may be performed by a similarity value component 630 as described with reference to FIG. 6.

At 1020, the method may include transmitting an indication of a first characteristic of the one or more first characteristics from the first data structure based on a respective similarity value corresponding to the first characteristic and a second characteristic of the one or more second characteristics satisfying a threshold similarity value. The operations of block 1020 may be performed in accordance with examples as disclosed herein. In some examples, aspects of the operations of 1020 may be performed by an indication component 635 as described with reference to FIG. 6.

Figure 11:
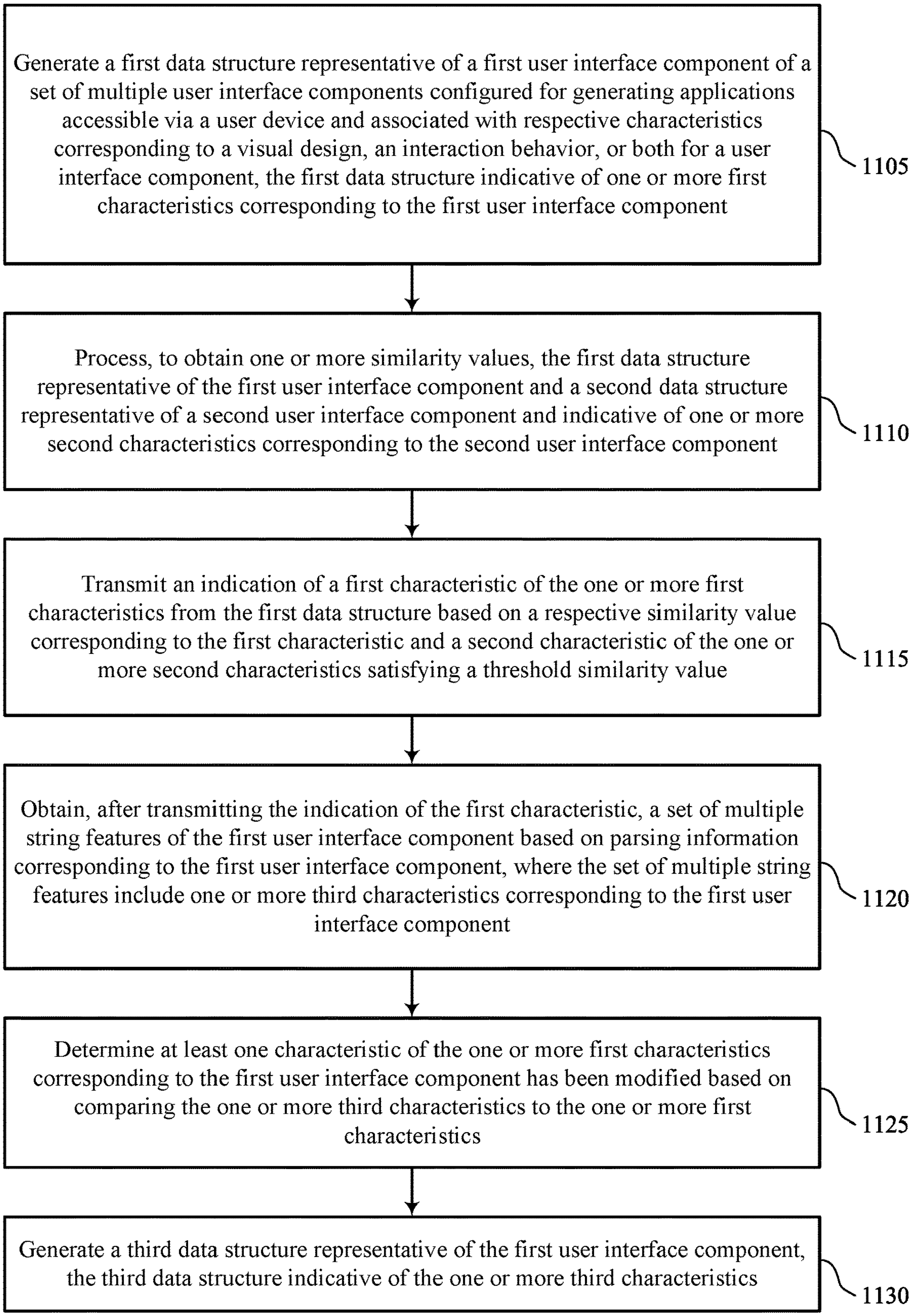

FIG. 11 shows a flowchart illustrating a method 1100 that supports component characteristics similarity comparison in accordance with aspects of the present disclosure. The operations of the method 1100 may be implemented by a Salesforce Device or its components as described herein. For example, the operations of the method 1100 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 1105, the method may include generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component. The operations of block 1105 may be performed in accordance with examples as disclosed herein. In some examples, aspects of the operations of 1105 may be performed by a data structure component 625 as described with reference to FIG. 6.

At 1110, the method may include processing, to obtain one or more similarity values, the first data structure representative of the first user interface component and a second data structure representative of a second user interface component and indicative of one or more second characteristics corresponding to the second user interface component. The operations of block 1110 may be performed in accordance with examples as disclosed herein. In some examples, aspects of the operations of 1110 may be performed by a similarity value component 630 as described with reference to FIG. 6.

At 1115, the method may include transmitting an indication of a first characteristic of the one or more first characteristics from the first data structure based on a respective similarity value corresponding to the first characteristic and a second characteristic of the one or more second characteristics satisfying a threshold similarity value. The operations of block 1115 may be performed in accordance with examples as disclosed herein. In some examples, aspects of the operations of 1115 may be performed by an indication component 635 as described with reference to FIG. 6.

At 1120, the method may include obtaining, after transmitting the indication of the first characteristic, a set of multiple string features of the first user interface component based on parsing information corresponding to the first user interface component, where the set of multiple string features include one or more third characteristics corresponding to the first user interface component. The operations of block 1120 may be performed in accordance with examples as disclosed herein. In some examples, aspects of the operations of 1120 may be performed by a string feature component 645 as described with reference to FIG. 6.

At 1125, the method may include determining at least one characteristic of the one or more first characteristics corresponding to the first user interface component has been modified based on comparing the one or more third characteristics to the one or more first characteristics. The operations of block 1125 may be performed in accordance with examples as disclosed herein. In some examples, aspects of the operations of 1125 may be performed by a characteristic change component 650 as described with reference to FIG. 6.

At 1130, the method may include generating a third data structure representative of the first user interface component, the third data structure indicative of the one or more third characteristics. The operations of block 1130 may be performed in accordance with examples as disclosed herein. In some examples, aspects of the operations of 1130 may be performed by a data structure component 625 as described with reference to FIG. 6.

A method by an apparatus is described. The method may include generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component, processing, to obtain one or more similarity values, the first data structure representative of the first user interface component and a second data structure representative of a second user interface component and indicative of one or more second characteristics corresponding to the second user interface component, and transmitting an indication of a first characteristic of the one or more first characteristics from the first data structure based on a respective similarity value corresponding to the first characteristic and a second characteristic of the one or more second characteristics satisfying a threshold similarity value.

An apparatus is described. The apparatus may include one or more memories storing processor executable code, and one or more processors coupled with the one or more memories. The one or more processors may individually or collectively operable to execute the code to cause the apparatus to generate a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component, process, to obtain one or more similarity values, the first data structure representative of the first user interface component and a second data structure representative of a second user interface component and indicative of one or more second characteristics corresponding to the second user interface component, and transmit an indication of a first characteristic of the one or more first characteristics from the first data structure based on a respective similarity value corresponding to the first characteristic and a second characteristic of the one or more second characteristics satisfying a threshold similarity value.

Another apparatus is described. The apparatus may include means for generating a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component, means for processing, to obtain one or more similarity values, the first data structure representative of the first user interface component and a second data structure representative of a second user interface component and indicative of one or more second characteristics corresponding to the second user interface component, and means for transmitting an indication of a first characteristic of the one or more first characteristics from the first data structure based on a respective similarity value corresponding to the first characteristic and a second characteristic of the one or more second characteristics satisfying a threshold similarity value.

A non-transitory computer-readable medium storing code is described. The code may include instructions executable by a processor to generate a first data structure representative of a first user interface component of a set of multiple user interface components configured for generating applications accessible via a user device and associated with respective characteristics corresponding to a visual design, an interaction behavior, or both for a user interface component, the first data structure indicative of one or more first characteristics corresponding to the first user interface component, process, to obtain one or more similarity values, the first data structure representative of the first user interface component and a second data structure representative of a second user interface component and indicative of one or more second characteristics corresponding to the second user interface component, and transmit an indication of a first characteristic of the one or more first characteristics from the first data structure based on a respective similarity value corresponding to the first characteristic and a second characteristic of the one or more second characteristics satisfying a threshold similarity value.

In some examples of the method, apparatus, and non-transitory computer-readable medium described herein, processing the first data structure representative of the first user interface component and the second data structure representative of the second user interface component may include operations, features, means, or instructions for obtaining a respective similarity value of a set of multiple similarity values based on comparing a first respective node of a first set of multiple nodes of the first data structure to a second respective node of a second set of multiple nodes of the second data structure and computing the one or more similarity values based on a numerical quantity of the first set of multiple nodes and the set of multiple similarity values.

In some examples of the method, apparatus, and non-transitory computer-readable medium described herein, the comparing includes a string comparison.

Some examples of the method, apparatus, and non-transitory computer-readable medium described herein may further include operations, features, means, or instructions for obtaining a set of multiple string features of the first user interface component based on parsing information corresponding to the first user interface component, where generating the first data structure may be based on determining the one or more first characteristics from the set of multiple string features of the first interface component.

Some examples of the method, apparatus, and non-transitory computer-readable medium described herein may further include operations, features, means, or instructions for obtaining, after transmitting the indication of the first characteristic, a set of multiple string features of the first user interface component based on parsing information corresponding to the first user interface component, where the set of multiple string features include one or more third characteristics corresponding to the first user interface component, determining at least one characteristic of the one or more first characteristics corresponding to the first user interface component may have been modified based on comparing the one or more third characteristics to the one or more first characteristics, and generating a third data structure representative of the first user interface component, the third data structure indicative of the one or more third characteristics.

In some examples of the method, apparatus, and non-transitory computer-readable medium described herein, generating the third data structure may include operations, features, means, or instructions for adding a third characteristic of the one or more third characteristics to the first data structure based on determining the third characteristic may be new to the user interface component.

In some examples of the method, apparatus, and non-transitory computer-readable medium described herein, generating the third data structure may include operations, features, means, or instructions for removing a third characteristic of the one or more first characteristics from the first data structure based on determining that the third characteristic may be excluded from the one or more third characteristics.

In some examples of the method, apparatus, and non-transitory computer-readable medium described herein, the first data structure includes a first tree data structure with one or more first leaf nodes corresponding to the one or more first characteristics and the second data structure includes a second tree data structure with one or more second leaf nodes corresponding to the one or more second characteristics.

In some examples of the method, apparatus, and non-transitory computer-readable medium described herein, processing the first data structure representative of the first user interface component and the second data structure representative of the second user interface component may include operations, features, means, or instructions for traversing the first tree data structure and the second tree data structure to compare the one or more first leaf nodes to the one or more second leaf nodes.

In some examples of the method, apparatus, and non-transitory computer-readable medium described herein, obtaining the one or more similarity values may include operations, features, means, or instructions for comparing, in accordance with a multi-line regression formula and a machine learning model, one or more first values associated with the first data structure to one or more second values associated with the second data structure.

In some examples of the method, apparatus, and non-transitory computer-readable medium described herein, the visual design, the interaction behavior, or both include one or more of a structure behavior, a user interaction behavior, an event behavior, a configurable behavior, a state behavior, or a relationship behavior.

Some examples of the method, apparatus, and non-transitory computer-readable medium described herein may further include operations, features, means, or instructions for displaying, via a user interface, a message indicating to a user to implement the first user interface component, the second user interface component, or both in accordance with the one or more similarity values.

The following provides an overview of aspects of the present disclosure:

Aspect 1: A method for data processing, comprising: generating a first data structure representative of a first user interface component of a plurality of user interface components configured for generating applications accessible via a user device and associated with respective characteristics corresponding to a visual design, an interaction behavior, or both for a user interface component, the first data structure indicative of one or more first characteristics corresponding to the first user interface component; processing, to obtain one or more similarity values, the first data structure representative of the first user interface component and a second data structure representative of a second user interface component and indicative of one or more second characteristics corresponding to the second user interface component; and transmitting an indication of a first characteristic of the one or more first characteristics from the first data structure based at least in part on a respective similarity value corresponding to the first characteristic and a second characteristic of the one or more second characteristics satisfying a threshold similarity value.

Aspect 2: The method of aspect 1, wherein processing the first data structure representative of the first user interface component and the second data structure representative of the second user interface component further comprises: obtaining a respective similarity value of a plurality of similarity values based at least in part on comparing a first respective node of a first plurality of nodes of the first data structure to a second respective node of a second plurality of nodes of the second data structure; and computing the one or more similarity values based at least in part on a numerical quantity of the first plurality of nodes and the plurality of similarity values.

Aspect 3: The method of aspect 2, wherein the comparing comprises a string comparison.

Aspect 4: The method of any of aspects 1 through 3, further comprising: obtaining a plurality of string features of the first user interface component based at least in part on parsing information corresponding to the first user interface component, wherein generating the first data structure is based at least in part on determining the one or more first characteristics from the plurality of string features of the first interface component.

Aspect 5: The method of any of aspects 1 through 4, further comprising: obtaining, after transmitting the indication of the first characteristic, a plurality of string features of the first user interface component based at least in part on parsing information corresponding to the first user interface component, wherein the plurality of string features comprise one or more third characteristics corresponding to the first user interface component; determining at least one characteristic of the one or more first characteristics corresponding to the first user interface component has been modified based at least in part on comparing the one or more third characteristics to the one or more first characteristics, generating a third data structure representative of the first user interface component, the third data structure indicative of the one or more third characteristics.

Aspect 6: The method of aspect 5, wherein generating the third data structure comprises: adding a third characteristic of the one or more third characteristics to the first data structure based at least in part on determining the third characteristic is new to the user interface component.

Aspect 7: The method of any of aspects 5 through 6, wherein generating the third data structure comprises: removing a third characteristic of the one or more first characteristics from the first data structure based at least in part on determining that the third characteristic is excluded from the one or more third characteristics.

Aspect 8: The method of any of aspects 1 through 7, wherein the first data structure comprises a first tree data structure with one or more first leaf nodes corresponding to the one or more first characteristics; and the second data structure comprises a second tree data structure with one or more second leaf nodes corresponding to the one or more second characteristics.

Aspect 9: The method of aspect 8, wherein processing the first data structure representative of the first user interface component and the second data structure representative of the second user interface component further comprises: traversing the first tree data structure and the second tree data structure to compare the one or more first leaf nodes to the one or more second leaf nodes.

Aspect 10: The method of any of aspects 1 through 9, wherein obtaining the one or more similarity values further comprises: comparing, in accordance with a multi-line regression formula and a machine learning model, one or more first values associated with the first data structure to one or more second values associated with the second data structure.

Aspect 11: The method of any of aspects 1 through 10, wherein the visual design, the interaction behavior, or both comprise one or more of a structure behavior, a user interaction behavior, an event behavior, a configurable behavior, a state behavior, or a relationship behavior.

Aspect 12: The method of any of aspects 1 through 11 further comprising: displaying, via a user interface, a message indicating to a user to implement the first user interface component, the second user interface component, or both in accordance with the one or more similarity values Aspect 13: An apparatus comprising one or more memories storing processor-executable code, and one or more processors coupled with the one or more memories and individually or collectively operable to execute the code to cause the apparatus to perform a method of any of aspects 1 through 12.

Aspect 14: An apparatus comprising at least one means for performing a method of any of aspects 1 through 12.

Aspect 15: A non-transitory computer-readable medium storing code the code comprising instructions executable by a processor to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

generating a first data structure representative of a first user interface component of a plurality of user interface components that are configured for generating applications accessible via a user device, the plurality of user interface components associated with respective interaction behaviors for a user interface component, the first data structure indicative of one or more first relationship chains of interaction behaviors identified based on processing of code defining the first user interface component, wherein the one or more first relationship chains of interaction behaviors comprise at least one chaining sequence from among a first chaining sequence of user interaction behavior leading to structure behavior, a second chaining sequence of event behavior leading to structure behavior, and a third chaining sequence of user interaction behavior leading to event behavior;

processing, to obtain one or more similarity values, the first data structure representative of the first user interface component and a second data structure representative of a second user interface component and indicative of one or more second relationship chains of interaction behaviors identified based on processing of code defining the second user interface component; and transmitting an indication of a first interaction behavior of the one or more first relationship chains of interaction behaviors from the first data structure based at least in part on a respective similarity value for the first data structure and the second data structure, the respective similarity value being based at least in part on one or more comparisons between interaction behaviors of the one or more first relationship chains and interaction behaviors of the one or more second relationship chains and a total number of interaction behaviors between the one or more first relationship chains and the one or more second relationship chains.

2. The method of claim 1, wherein processing the first data structure representative of the first user interface component and the second data structure representative of the second user interface component further comprises:

obtaining the respective similarity value of a plurality of similarity values based at least in part on comparing a first respective node of a first plurality of nodes of the first data structure to a second respective node of a second plurality of nodes of the second data structure; and computing the one or more similarity values based at least in part on a numerical quantity of the first plurality of nodes and the plurality of similarity values.

3. The method of claim 2, wherein the comparing comprises a string comparison.

4. The method of claim 1, further comprising:

obtaining a plurality of string features of the first user interface component based at least in part on parsing information corresponding to the first user interface component, wherein generating the first data structure is based at least in part on determining the one or more first relationship chains of interaction behaviors from the plurality of string features of the first user interface component.

5. The method of claim 1, further comprising:

obtaining, after transmitting the indication of the first interaction behavior, a plurality of string features of the first user interface component based at least in part on parsing information corresponding to the first user interface component, wherein the plurality of string features comprise one or more third relationship chains of interaction behaviors for the first user interface component;

determining at least one interaction behavior of the one or more first relationship chains of interaction behaviors for the first user interface component has been modified based at least in part on comparing the one or more third relationship chains of interaction behaviors to the one or more first relationship chains of interaction behaviors; and generating a third data structure representative of the first user interface component, the third data structure indicative of the one or more third relationship chains of interaction behaviors.

6. The method of claim 5, wherein generating the third data structure comprises:

adding a third interaction behavior of the one or more third relationship chains of interaction behaviors to the first data structure based at least in part on determining the third interaction behavior is new to the user interface component.

7. The method of claim 5, wherein generating the third data structure comprises:

removing a third interaction behavior of the one or more first relationship chains of interaction behaviors from the first data structure based at least in part on determining that the third interaction behavior is excluded from the one or more third relationship chains of interaction behaviors.

8. The method of claim 1, wherein:

the first data structure comprises a first tree data structure with one or more first leaf nodes corresponding to the one or more first relationship chains of interaction behaviors; and the second data structure comprises a second tree data structure with one or more second leaf nodes corresponding to the one or more second relationship chains of interaction behaviors.

9. The method of claim 8, wherein processing the first data structure representative of the first user interface component and the second data structure representative of the second user interface component further comprises:

traversing the first tree data structure and the second tree data structure to compare the one or more first leaf nodes to the one or more second leaf nodes.

10. The method of claim 1, wherein obtaining the one or more similarity values further comprises:

comparing, in accordance with a multi-line regression formula and a machine learning model, one or more first values associated with the first data structure to one or more second values associated with the second data structure.

11. The method of claim 1, wherein the interaction behaviors comprises one or more of a structure behavior, a user interaction behavior, an event behavior, a configurable behavior, a state behavior, or a relationship behavior.

12. The method of claim 1 further comprising:

displaying, via a user interface, a message indicating to a user to implement the first user interface component, the second user interface component, or both in accordance with the one or more similarity values.

13. An apparatus, comprising:

one or more memories storing processor-executable code; and one or more processors coupled with the one or more memories and individually or collectively operable to execute the code to cause the apparatus to:

generate a first data structure representative of a first user interface component of a plurality of user interface components that are configured for generating applications accessible via a user device, the plurality of user interface components associated with respective interaction behaviors for a user interface component, the first data structure indicative of one or more first relationship chains of interaction behaviors identified based on processing of code defining the first user interface component, wherein the one or more first relationship chains of interaction behaviors comprise at least one chaining sequence from among a first chaining sequence of user interaction behavior leading to structure behavior, a second chaining sequence of event behavior leading to structure behavior, and a third chaining sequence of user interaction behavior leading to event behavior;

process, to obtain one or more similarity values, the first data structure representative of the first user interface component and a second data structure representative of a second user interface component and indicative of one or more second relationship chains of interaction behaviors identified based on processing of code defining the second user interface component; and transmit an indication of a first interaction behavior of the one or more first relationship chains of interaction behaviors from the first data structure based at least in part on a respective similarity value for the first data structure and the second data structure, the respective similarity value being based at least in part on one or more comparisons between interaction behaviors of the one or more first relationship chains and interaction behaviors of the one or more second relationship chains and a total number of interaction behaviors between the one or more first relationship chains and the one or more second relationship chains.

14. The apparatus of claim 13, wherein, to process the first data structure representative of the first user interface component and the second data structure representative of the second user interface component, the one or more processors are individually or collectively further operable to execute the code to cause the apparatus to:

obtain the respective similarity value of a plurality of similarity values based at least in part on comparing a first respective node of a first plurality of nodes of the first data structure to a second respective node of a second plurality of nodes of the second data structure; and compute the one or more similarity values based at least in part on a numerical quantity of the first plurality of nodes and the plurality of similarity values.

15. The apparatus of claim 14, wherein the comparing comprises a string comparison.

16. The apparatus of claim 13, wherein the one or more processors are individually or collectively further operable to execute the code to cause the apparatus to:

obtain a plurality of string features of the first user interface component based at least in part on parsing information corresponding to the first user interface component, wherein generating the first data structure is based at least in part on determining the one or more first relationship chains of interaction behaviors from the plurality of string features of the first user interface component.

17. The apparatus of claim 13, wherein the one or more processors are individually or collectively further operable to execute the code to cause the apparatus to:

obtain, after transmitting the indication of the first interaction behavior, a plurality of string features of the first user interface component based at least in part on parsing information corresponding to the first user interface component, wherein the plurality of string features comprise one or more third relationship chains of interaction behaviors for the first user interface component;

determine at least one interaction behavior of the one or more first relationship chains of interaction behaviors for the first user interface component has been modified based at least in part on comparing the one or more third relationship chains of interaction behaviors to the one or more first relationship chains of interaction behaviors; and generate a third data structure representative of the first user interface component, the third data structure indicative of the one or more third relationship chains of interaction behaviors.

18. A non-transitory computer-readable medium storing code, the code comprising instructions executable by one or more processors to:

generate a first data structure representative of a first user interface component of a plurality of user interface components that are configured for generating applications accessible via a user device, the plurality of user interface components associated with respective interaction behaviors for a user interface component, the first data structure indicative of one or more first relationship chains of interaction behaviors identified based on processing of code defining the first user interface component, wherein the one or more first relationship chains of interaction behaviors comprise at least one chaining sequence from among a first chaining sequence of user interaction behavior leading to structure behavior, a second chaining sequence of event behavior leading to structure behavior, and a third chaining sequence of user interaction behavior leading to event behavior;

process, to obtain one or more similarity values, the first data structure representative of the first user interface component and a second data structure representative of a second user interface component and indicative of one or more second relationship chains of interaction behaviors identified based on processing of code defining the second user interface component; and transmit an indication of a first interaction behavior of one or more the one or more first relationship chains of interaction behaviors from the first data structure based at least in part on a respective similarity value for the first data structure and the second data structure, the respective similarity value being based at least in part on one or more comparisons between interaction behaviors of the one or more first relationship chains and interaction behaviors of the one or more second relationship chains and a total number of interaction behaviors between the one or more first relationship chains and the one or more second relationship chains.

19. The method of claim 1, wherein the interaction behaviors comprise a structure behavior, a user interaction behavior, an event behavior, a configurable behavior, and a state behavior, the method further comprising:

computing the respective similarity value using a multi-line regression formula that divides a sum of behavior similarity values and relationship similarity values by a total number of behaviors and relationships between the first data structure and the second data structure.

20. The method of claim 1, wherein generating the first data structure comprises:

parsing cascading style sheets (CSS), hypertext markup language (HTML), and JavaScript code defining the first user interface component to identify code snippets that define one or more interaction behaviors;

extracting one or more structure behaviors from HTML tag structure and CSS declarations;

extracting one or more user interaction behaviors from user triggerable events including mouse events and keyboard events;

extracting one or more event behaviors from non-user triggered events including custom events and listeners;

extracting one or more configurable behaviors from public configurable properties including attributes and slots; and extracting one or more state behaviors from internal state properties of the first user interface component.

* * * * *